A. B. WILDER.
POWER BRAKE.
APPLICATION FILED SEPT. 16, 1915.
1,212,302.
Patented Jan. 16, 1917.
2 SHEETS—SHEET 2.
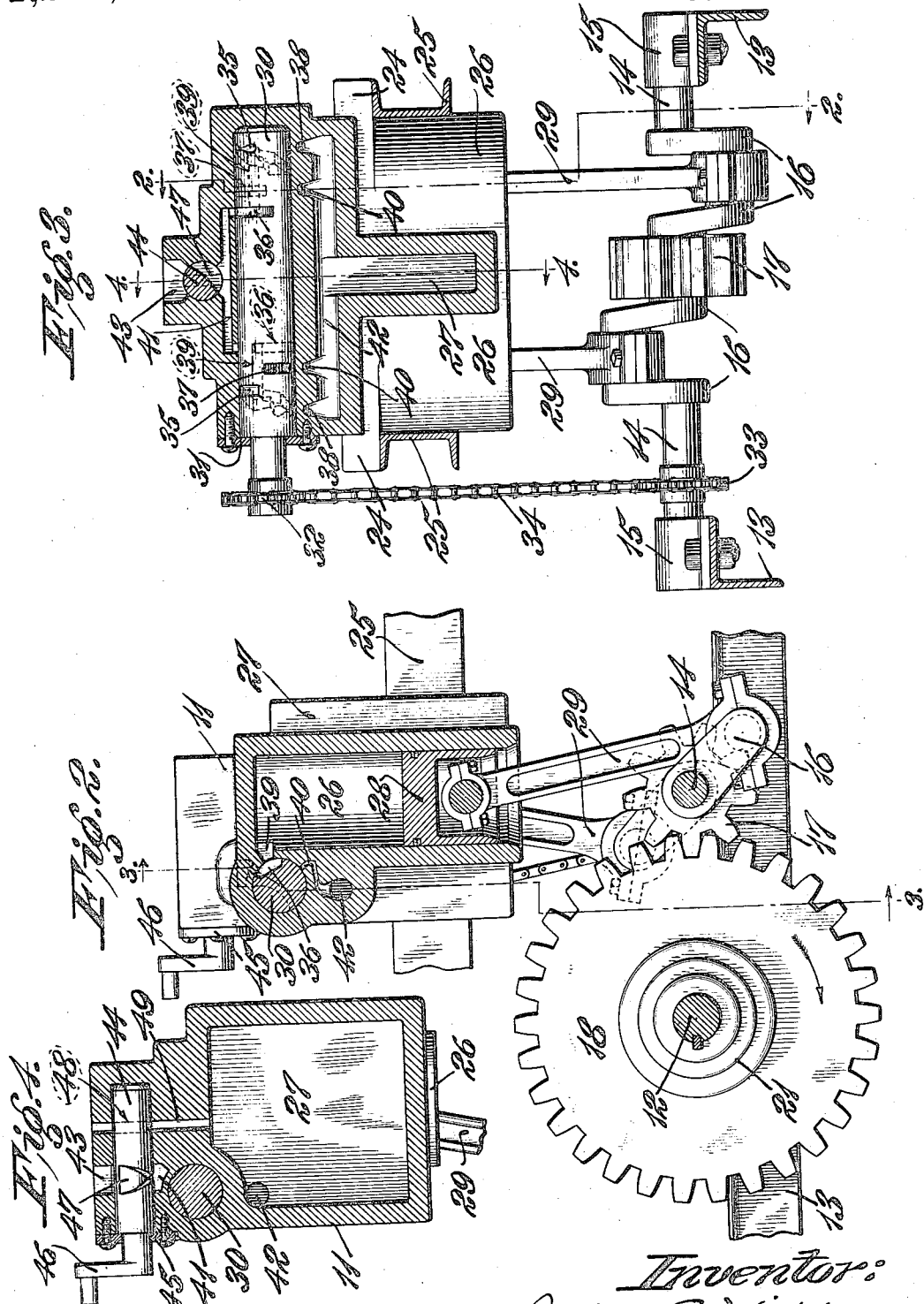

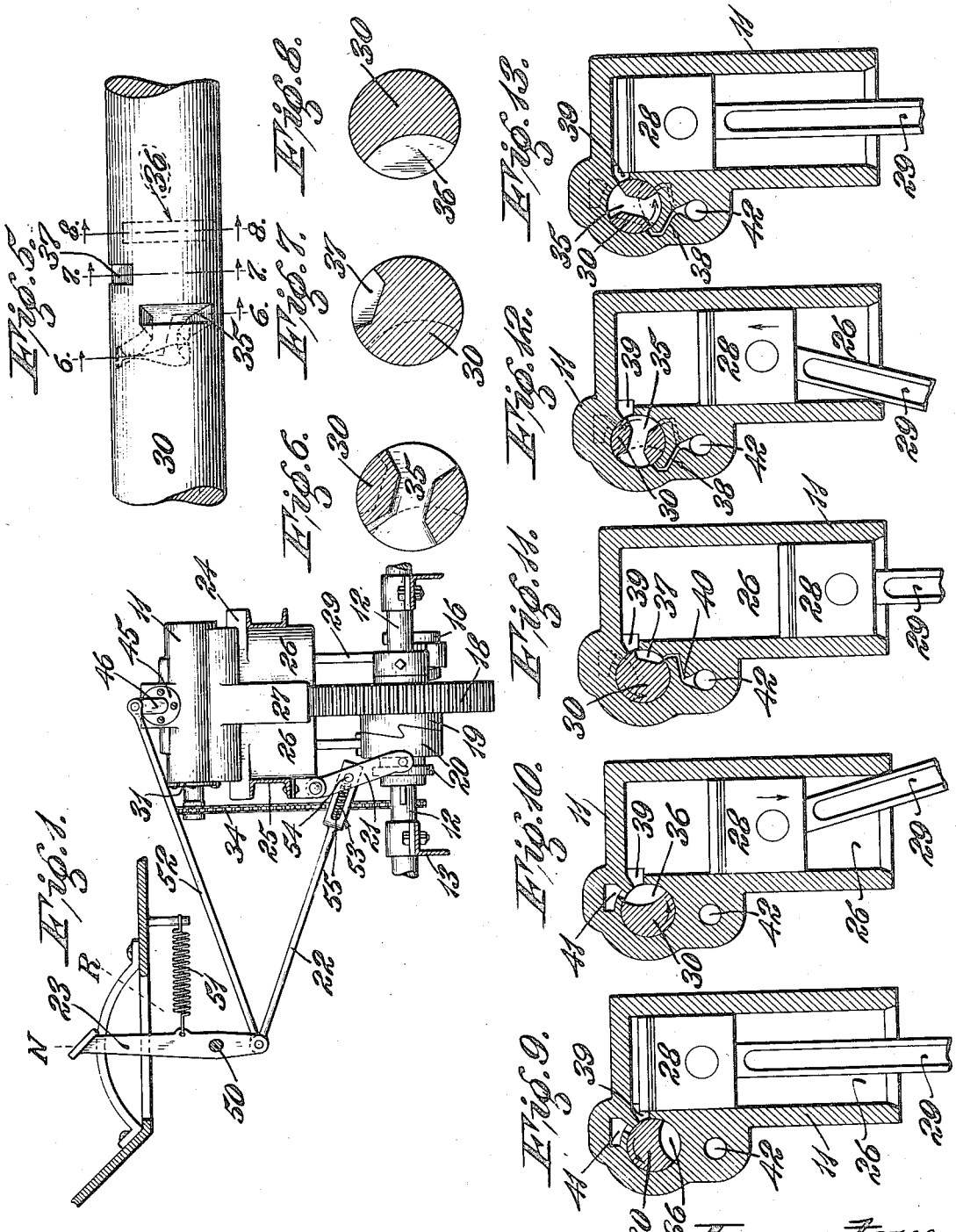

UNITED STATES PATENT OFFICE.

ALLEN B. WILDER, OF ST. LOUIS, MISSOURI.

POWER-BRAKE.

1,212,302.   Specification of Letters Patent.   Patented Jan. 16, 1917.

Application filed September 16, 1915.   Serial No. 50,922.

*To all whom it may concern:*

Be it known that I, ALLEN B. WILDER, a citizen of the United States, and a resident of the city of St. Louis and State of Missouri, have invented a new and useful Improvement in Power-Brakes, of which the following is a specification.

This invention relates to power brakes, especially to such power brakes as are adapted for use on moving vehicles and the like.

The invention relates more particularly to pneumatic brakes in which the braking force is produced by the action of compressing air in an air pump, air compressor or the like.

One of the objects of the invention is a power brake in which braking action can be easily controlled and regulated by the operator of the vehicle, and which will produce a uniform braking force regardless of the speed at which the vehicle is traveling.

A further object is a power brake of the air compressor type in which the air can be supplied to the compressor for compression at a pressure higher than the atmospheric pressure, without the use of a previously charged tank or other external source of air pressure, whereby the size of the compressor may be small compared to the braking action which it will produce.

Further objects relate to the details of the construction of power brakes, whereby their efficiency and durability is increased.

Generally stated, the invention consists in an air compressor arranged to be coupled to and uncoupled from the rotating axle or wheel of a vehicle, a pressure chamber into which air is compressed by said compressor, together with a valve mechanism for admitting air to the cylinders of said compressor and for discharging it from the cylinders into said intermediate pressure chamber, and means arranged to be controlled by the operator of the vehicle for regulating the supply of outside air to said valve mechanism and the exhaust of air from the pressure chamber.

The invention further consists in the parts, and in the arrangements and combinations of parts, more fully set forth hereinafter.

Suitable apparatus for illustrating the principles of construction and operation of the invention is shown in the accompanying drawings.

In the drawings, wherein the same reference characters designate like parts of the apparatus in the several views, Figure 1 is a side elevation of the power brake, showing the clutch connection to a rotating shaft of the vehicle; Fig. 2 is a vertical cross-section through a cylinder of the power brake, to a larger scale than Fig. 1, the section being taken on the line 2—2 in Fig. 3; Fig. 3 is a part side elevation and part vertical longitudinal section on the line 3—3 in Fig. 2 of the same; Fig. 4 is a vertical cross-section of the same through the intermediate chamber, on the line 4—4 in Fig. 3; Fig. 5 is a side view of the admission and exhaust valve; Figs. 6, 7 and 8 are cross-sections through the admission and exhaust valve, on the lines 6—6, 7—7 and 8—8, respectively, in Fig. 5; and Figs. 9 to 13, inclusive, are vertical cross-sections similar to Fig. 2, showing the piston and valve in different positions at successive points in the cycle of operation of the device.

The form of power brake shown in the accompanying drawings is constructed for use on a motor vehicle. The power brake may be directly driven from the road wheels of the motor vehicle, or it may be connected to the driving axle, or to the driving-shaft of the motor vehicle. In the construction shown in the drawings, the power brake 11 consists of a duplex single acting air pump which is connected to the vehicle wheels to be driven thereby through a driving-shaft 12, which is supported in suitable bearings on the angle shape frame members 13, which may form part of the chassis. Arranged alongside of the driving-shaft 12 and substantially parallel therewith is the pump crank-shaft 14, which is supported by bearings 15 fixed to the frame 13 or chassis of the motor vehicle. The crank-shaft is provided with two cranks 16 arranged at an angle of 180° to each other, and between these cranks a small gear 17 is fixed to the crank shaft. A large gear 18, which meshes with the small gear 17, is mounted loosely upon the driving shaft 12. The hub of the large gear 18 is provided with clutch teeth 19 which are arranged to coöperate with teeth mounted on a sliding clutch member 20, which is keyed to the driving shaft 12 so as to slide thereon, and at the same time turn therewith. This clutch 20 may be thrown into and out of clutching engagement by any suitable means, such as the shifting yoked lever 21, actuating rod 22 and foot pedal 23.

The body of the power brake 11 is arranged vertically above the crank-shaft 14 and is supported by lugs or projections 24 integral therewith, which rest upon and are secured to two channels 25. The channels 25 are suitably secured to the frame or chassis of the motor vehicle. The body of the power brake comprises two vertical cylinders 26, and a pressure chamber 27 arranged between said cylinders. The walls of the pressure chamber 27 extend beyond the outer walls of the cylinders 26 and may have integral therewith ribs or other projections, which increase the capacity of said pressure chamber to give off heat to the atmosphere. In the cylinders 26 are pistons 28 which are suitably connected by connecting rods 29 to the cranks 16 of the crank-shaft 14.

A cylindrical valve casing or chamber is formed in the upper part of the body of the power brake 11 extending longitudinally thereof and connecting with the cylinders 26. A cylindrical rotary valve 30 is arranged in this chamber for effecting admission of air to the cylinders and its exhaust therefrom to the pressure chamber. One end of the valve 30 extends through a suitable cover plate or stuffing box 31 and is provided with a sprocket wheel 32. Upon the crank-shaft 14 is mounted a similar sprocket wheel 33 having the same number of teeth as the sprocket wheel 32. A chain 34 connects the two sprocket wheels and causes them to rotate together.

In the periphery of the valve 30 near each end thereof are three passages or grooves, 35, 36, 37, which extend transversely with respect to the axis of the valve and are spaced apart lengthwise of the valve, as shown in Figs. 3 and 5. The end passages 35 go through the valve from side to side at an angle to the axis of the valve, so that the ends of each passage 35 are not in circular alinement. The inner passages 36 are narrow slots cut into the side of the valve, and the middle passages 37 are likewise narrow slots cut into the side of the valve. The corresponding passages at each end of the valve are arranged 180° apart. At each end of the casing in which the valve is fitted are four ports 38, 39, 40 and 41. The end ports 38 and the middle ports 40 are arranged below the valve and communicate through a passage 42 with the pressure chamber 27; the long narrow ports 39 in the side of the chamber lead into the cylinders; and the inner ports 41 above the valve open into a passage 43 which extends to the inlet control valve 44 and the outside air. The grooves in the valve 30 at each end thereof cover and uncover the ports at the corresponding end of said casing when said valve is actuated, so as to establish simultaneous communication between the middle or cylinder port at one end of the valve and the upper port leading to the inlet valve, and at the other end of the valve between the cylinder port and the lower ports leading to the pressure chamber, and vice versa, for each rotation of the valve.

The inlet control valve 44 is located in a chamber above the valve 30 and arranged transversely thereto. The valve 44 is a rocking valve, and one end extends out of the casing through a suitable cover plate 45 or stuffing box and is provided with a crank arm 46. A rod 52 connects the end of the crank arm 46 with the lower end of the pedal 23. In the periphery of the valve 44 near one end thereof is a V-shaped groove 47, which extends part way around the valve and is deepest at its widest end. In certain positions of the valve 44 this V-shaped groove provides means of communication between the outside air and the inlet passage 43; and since said groove varies in cross-section, the flow of outside air into said inlet passage can be regulated by the proper movements of the valve.

In the periphery of the valve 44 near the middle thereof is an exhaust passage 48 which controls the exhaust of air from the pressure chamber along a passage 49 leading to the outside air. The inlet groove and the exhaust passage of the control valve 44 are located at opposite points in the periphery of said valve, so that when the inlet groove opens communication between the inlet passage and the outside air, the exhaust passage will close communication between the pressure chamber and the outside air, and vice versa.

The braking action of the power brake is controlled by the movements of the pedal 23 projecting through the foot board of the motor vehicle. The pedal 23 is pivotally mounted between its ends on a rod or shaft 50 fixed to the body of the motor vehicle (not shown). Between the pedal and a fixed part of the body of the motor vehicle is connected a tension spring 51, which serves to normally hold the pedal in its rearmost position. The sliding clutch member 20 is actuated by a swinging arm or yoke 21, according to the usual construction, to operatively connect the brake driving gears to said driving shaft. The swinging arm is pivotally mounted at its upper end in a bracket or hanger secured to the adjacent channel. The actuating rod 22 is pivoted at one end to the lower end of the pedal, and at its other end it has a longitudinal slot 53 which engages a pin 54 secured to the arm 21. Interposed between the forward end of the slot and the pin is a compression spring 55, which permits further movement of the rod rearwardly relative to the swinging arm after the clutch is engaged.

The operation of the power brake hereinbefore described is as follows: Under normal conditions, when there is no braking action, the pedal is in its rearmost or released position, indicated by the dotted line R in Fig. 1. In this normal or release position of the pedal, the control valve 44 is in the position in which the passage leading from the pressure chamber to the outside air is wide open and the passage leading to the inlet passage is closed, as shown in Fig. 4; and the sliding clutch member 20 is out of engagement with the gear. To apply the brake the operator presses forward on the pedal. The amount of forward movement of the pedal determines the degree of operation of the power brake; and to make the operation of the power brake clear it will be described for several different positions of the pedal. As the pedal is moved forward from its normal position the clutch actuating rod 22 connected thereto is moved rearwardly to engage the sliding clutch member with the large gear. The control valve rod is also moved rearwardly and the control valve is rocked away from its release position toward the neutral position, that is, the position in which the passage leading from the pressure chamber to the outside air is closed and the passage leading to the inlet chamber is closed. The clutch rotates the large gear on the driving shaft and the latter rotates the crank-shaft gear, thus rotating the rotary valve 30, and also causing the pistons to reciprocate in their cylinders. With the pedal in the neutral position, indicated by the dotted line N, the control valve is moved to a point where the passage leading from the pressure chamber to the outside air is closed, thus shutting off the exhaust of air from said pressure chamber. The passage from the outside air to the inlet passage is also closed in this position of the control valve, so that no outside air is being supplied to the compressor. In the neutral position there is no supply of air to the cylinders, and the pressure in the pressure chamber will operate to retard the movement of the pistons, since it is exerted against them during the upstroke only. If the pressure in the pressure chamber is in excess of atmospheric pressure there will be a constant retarding or braking effect produced which will be nearly proportional to the difference in pressure between the inlet passage and pressure chamber with the pistons in mid-position of the stroke.

All positions of the pedal beyond the neutral position are braking positions, in which the control valve is partly opened to allow outside air to enter the inlet passage, the passage leading from the pressure chamber to the outside air remaining closed.

During the rotation of the crank-shaft, the valve 30 is operated by the sprockets and chain. The different positions of the valve corresponding to the different positions of the piston are shown in Figs. 9 to 13 for one cylinder. In Fig. 9, the piston is at the upper end of its compression stroke, and is starting down on its suction stroke. In this position of the piston all of the ports are closed, and the groove 36 of the valve is about to open communication between the ports 39 and 41, thus allowing air to pass from the inlet passage 43 to the cylinder. In Fig. 10, the piston is shown as having moved about half way down on its suction stroke, in which position the groove 36 in the valve spans the ports 39 and 41 and provides communication between the inlet passage and the cylinder. Fig. 11 shows the piston at the end of its suction stroke and about to start upward on its compression stroke. In this position of the piston the groove 37 of the valve provides communication between the ports 39 and 40, and thus allows previously compressed air to flow into the cylinder from the pressure chamber. Further rotation of the valve closes communication through the passage 37 and prevents the return or exhaust of compressed air from the cylinder to the pressure chamber. Fig. 12 shows the piston part way up on its compression stroke, at which point there is no communication through the valve passages to the cylinder. Further rotation of the valve will cause the groove 35 to establish communication between the ports 39 and 38 and open communication between the cylinder and pressure chamber for the remainder of the stroke, thereby permitting the compressed air in the cylinder to be exhausted into the pressure chamber. Fig. 13 shows the piston returned to its upper position, and ready to commence another cycle, the groove 35 having moved out of communication with the cylinder port 39 and all ports being closed. The pistons of the two cylinders are connected to move in opposite directions, and while the piston in one cylinder is compressing the air therein, the piston in the other cylinder is moving downward on its suction stroke and drawing in a new charge. Hence, when the valve is in the position shown in Fig. 9 for one cylinder it is in the position shown in Fig. 11 for the other cylinder.

When the pedal is moved to one of the braking positions, and external air is free to flow into the inlet passage, the pistons in the cylinders commence to compress air into the pressure chamber. The pressure in the pressure chamber increases rapidly because of the small volume of the pressure chamber compared with the volumes of the cylinders;

and after a few strokes the pistons in the cylinders are compressing air against a pressure sufficient to exert a powerful braking action. A relief valve may be provided for the pressure chamber to keep the pressure from exceeding a safe amount. When the pressure has built up sufficiently in the pressure chamber to produce the braking action which the operator wishes, he relaxes the pressure on the pedal, allowing the spring to bring the pedal back to its neutral position. In this neutral position, further supply of outside air to the compressor is stopped, and the cylinders operate to alternately expand and compress the air accumulated in the pressure chamber, thereby producing a uniform braking effect.

Referring again to Fig. 9, if the brake crank-shaft is rotating in the reverse direction, when the piston is moving down on its suction stroke no outside air can enter through the inlet chamber, and the air in the pressure chamber expands to fill the cylinder. Under these conditions, a pressure less than atmospheric is exerted upon the upper face of the piston, whereas atmospheric pressure is exerted on the lower face of the piston. This difference in pressure opposes the downward movement of the piston and aids in retarding the motor vehicle. The valve 30 is operated by the sprockets and chain in the opposite direction to that hereinbefore described; and shortly after the beginning of the upward or compression stroke, the cylinder is placed in communication with the inlet chamber. If the control valve is in neutral or release position, there is compressed air in the inlet chamber which expands into the cylinder and opposes the upward movement of the piston, thereby producing a strong braking effect. As the piston moves upwardly it reduces the total volume of the inlet chamber and the cylinder, thus comprising the air and increasing the braking effect. As the piston nears the end of its upstroke or compression stroke, the valve 30 closes communication with the inlet chamber and at the end of the stroke opens communication between the cylinder and the pressure chamber, thus allowing the remaining compressed air to expand from the cylinder into the pressure chamber, which has just emptied its contents into said other cylinder. Consequently the pressure of the air in the first cylinder is reduced and the pressure of the air compressed in the clearance space of the cylinder is decreased to the point where it is at or below atmospheric pressure when the piston starts on the down stroke.

In case the operator wishes to reduce the braking force when the vehicle is moving forward, he allows the pedal to swing back to the release position; but when the vehicle is moving backward he pushes it forward to the braking position to reduce the braking effect. In this release position of the pedal the passage leading from the pressure chamber to the outside air is partly opened, and the air in said pressure chamber is allowed to escape gradually. To fully release the brake, the operator allows the pedal to swing back to its normal position, whereupon the sliding clutch member is disengaged, and the air is fully exhausted from the pressure chamber.

The power brake hereinbefore described exerts substantially a uniform torque upon the crank-shaft, since the grooves of the valve have their cross-section proportioned with regard to the movement of the valve and the movements of the pistons so that the area of the openings for the passage of air from the cylinders to the pressure chamber varies according to the variation in velocity of the pistons during their compression stroke, and the variation in angular position of the connecting rods relatively to the axes of the cylinders. In other words, the exhaust of air from the cylinders is so regulated by the valve that the pressure of the air developed in the cylinders at the different points in their travel is such that the tangential force exerted by the cranks upon the connecting rods is as nearly as possible substantially the same.

It is evident from the foregoing that the cylinders compress air alternately into the pressure chamber, which may be provided with ribs by means of which it is rapidly cooled. The full force of braking is developed by only a few strokes of the pistons, and the force of braking is controlled by simultaneously regulating the restriction placed on exhaust from the cylinders and the supply of air to the cylinders; and that such regulation can be had for both forward and reverse movement of the vehicle. After the desired braking force has been developed, it may be kept substantially constant, increased or decreased as desired.

The pressure of the air in the cylinders during the compression strokes of the pistons is that accumulated in the pressure chamber, instead of the atmospheric pressure, as in the case of the ordinary air pump or compressor, and consequently, the volume of the cylinders need not be large to produce the necessary braking force. Only one handle or lever is necessary to control the operation of the power brake.

I claim the following as my invention:

1. A power brake for motor vehicles and the like comprising an air compressor, a valve mechanism for controlling the admission and exhaust of air to said compressor, said valve mechanism being automatically actuated by said compressor, a pressure chamber communicating with the exhaust of said compressor, and means arranged to be operated by the operator of the motor vehicle for regulating the supply of outside air to said valve mechanism.

2. A power brake for motor vehicles and the like comprising an air compressor, a valve mechanism automatically operated by said compressor and controlling the admission and exhaust of air thereto, the pressure chamber communicating with the exhaust of said compressor, a clutch device for operatively connecting said compressor to the wheels of the motor vehicle, and means arranged to be operated by the operator of the motor vehicle for operating said clutch and for regulating the supply of outside air to said valve mechanism.

3. A power brake for motor vehicles and the like comprising an air compressor having two cylinders, each of said cylinders having one end thereof open, a valve mechanism automatically operated by said compressor and controlling the admission and exhaust of air thereto, a pressure chamber communicating with the exhaust of said cylinders, and means arranged to be operated by the operator of the motor vehicle for regulating the supply of outside air to said valve mechanism.

4. A power brake for motor vehicles and the like comprising an air compressor, a valve mechanism automatically operated by said compressor and controlling the admission and exhaust of air thereto, a pressure chamber communicating with the exhaust of said compressor, a valve for regulating the supply of outside air to said valve mechanism, a valve for regulating the exhaust of air from said pressure chamber, and means arranged to be operated by the operator of the motor vehicle for actuating said valves.

5. A power brake for motor vehicles and the like comprising an air compressor having two cylinders, pistons moving in said cylinders, means for operatively connecting said pistons to the wheels of the motor vehicle, a pressure chamber, a valve mechanism automatically operated by said compressor and controlling the supply of air to said cylinders and the exhaust of air from said cylinders to said pressure chamber, and means for regulating the supply of outside air to said mechanism and for regulating the exhaust of air from said pressure chamber.

6. A power brake for motor vehicles comprising an air compressor, a valve mechanism automatically operated by said compressor and controlling the admission and exhaust of air thereto, a pressure chamber communicating with the exhaust of said compressor, a clutch device for operatively connecting said compressor to the wheels of the motor vehicle, a valve for regulating the supply of outside air to said valve mechanism and the exhaust air from said pressure chamber, and a pedal arranged to be operated by the operator of the motor vehicle, said clutch device and said valve being operatively connected to said pedal.

7. A power brake for motor vehicles and the like comprising an air compressor, a clutch device for operatively connecting said compressor to the wheels of the motor vehicle, a valve mechanism automatically operated by said compressor and controlling the admission and exhaust of air thereto, a pressure chamber communicating with the exhaust of said compressor, a valve for regulating the supply of outside air to said valve mechanism and the exhaust air from said pressure chamber, a pedal arranged to be operated by the operator of the motor vehicle, a rod connecting said valve and said pedal, and a second rod connected to said pedal and having a lost motion connection with said clutch device, whereby said valve may be moved independently of said clutch device in operative position of the latter.

8. A power brake for motor vehicles and the like comprising two cylinders, pistons moving in said cylinders, a crank-shaft to which said pistons are connected to compress air alternately in said cylinders, and a valve for controlling the admission and exhaust of air from said cylinders, said valve being operated automatically by said crank shaft, said valve regulating the exhaust of air from said cylinders according to the variations in the velocity of the pistons in their travel during their compressor strokes and the angularity of the crank.

9. A power brake for motor vehicles and the like comprising a compressor, a valve mechanism automatically operated by said compressor and controlling the admissions and exhaust of air thereto, a pressure chamber communicating with the exhaust of said compressor, and a valve for simultaneously regulating the supply of outside air to said valve mechanism and the exhaust of air from said pressure chamber.

10. A power brake for motor vehicles and the like comprising two cylinders, pistons moving in said cylinders, a crank-shaft, said pistons being connected to said crankshaft and moving in opposite directions, a pressure chamber, a valve for controlling the supply of outside air to each cylinder and the exhaust from each cylinder to said pressure chamber, said valve being operated by said crank-shaft and being arranged and adapted to place both cylinders simultaneously in communication with said pressure chamber when either piston is near the end of its compression stroke.

11. A power brake for motor vehicles and the like comprising two cylinders, a pressure chamber into which said cylinders exhaust, and means for controlling the exhaust of said cylinders, said means operating to place both cylinders simultaneously in communication with said pressure chamber near the end of the compression stroke of each cylinder.

12. A power brake for motor vehicles and the like comprising two cylinders, a pressure chamber into which said cylinders exhaust, and means for controlling the inlet of air to said cylinders, said means operating to place each cylinder in communication with said pressure chamber near the end of its suction stroke.

13. A power brake for motor vehicles and the like comprising two cylinders, a pressure chamber into which said cylinders exhaust, and means for controlling the inlet of air to said cylinders, said means operating to place each cylinder in communication with said pressure chamber momentarily near the end of its suction stroke.

Signed at St. Louis, Missouri, this 13th day of September, 1915.

ALLEN B. WILDER.